(12) United States Patent
Taguchi

(10) Patent No.: US 9,460,835 B2
(45) Date of Patent: Oct. 4, 2016

(54) SINTERED FERRITE MAGNET AND MOTOR PROVIDED THEREWITH

(71) Applicant: TDK Corporation, Minato-ku, Tokyo (JP)

(72) Inventor: Hitoshi Taguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 30 days.

(21) Appl. No.: 14/379,012

(22) PCT Filed: Feb. 20, 2013

(86) PCT No.: PCT/JP2013/054231
§ 371 (c)(1),
(2) Date: Aug. 15, 2014

(87) PCT Pub. No.: WO2013/125601
PCT Pub. Date: Aug. 29, 2013

(65) Prior Publication Data
US 2015/0053883 A1    Feb. 26, 2015

(30) Foreign Application Priority Data

Feb. 20, 2012    (JP) .................................. 2012-034092

(51) Int. Cl.
| | | |
|---|---|---|
| *H01F 1/11* | (2006.01) | |
| *H01F 1/03* | (2006.01) | |
| *C04B 35/626* | (2006.01) | |
| *H02K 1/02* | (2006.01) | |
| *C04B 35/26* | (2006.01) | |

(52) U.S. Cl.
CPC ............. *H01F 1/0315* (2013.01); *C04B 35/26* (2013.01); *C04B 35/6262* (2013.01); *H01F 1/11* (2013.01); *H02K 1/02* (2013.01); *C04B 2235/3201* (2013.01); *C04B 2235/3208* (2013.01); *C04B 2235/3213* (2013.01); *C04B 2235/3215* (2013.01); *C04B 2235/3418* (2013.01); *C04B 2235/5409* (2013.01); *C04B 2235/5436* (2013.01); *C04B 2235/5445* (2013.01); *C04B 2235/72* (2013.01); *C04B 2235/728* (2013.01); *C04B 2235/767* (2013.01); *C04B 2235/782* (2013.01); *C04B 2235/785* (2013.01); *C04B 2235/788* (2013.01); *C04B 2235/80* (2013.01)

(58) Field of Classification Search
CPC .................................. H01F 1/10; H02K 1/02
See application file for complete search history.

(56) References Cited

U.S. PATENT DOCUMENTS

| | | | |
|---|---|---|---|
| 5,858,124 A | 1/1999 | Endo et al. | |
| 6,139,766 A | 10/2000 | Taguchi et al. | |
| 7,651,626 B2 * | 1/2010 | Gonda | ................ C04B 35/2633 252/62.6 |
| 2009/0314981 A1 | 12/2009 | Yanagida et al. | |

FOREIGN PATENT DOCUMENTS

| | | | |
|---|---|---|---|
| JP | S51-133798 A | | 11/1976 |
| JP | S52-17694 | | 2/1977 |
| JP | 54-71395 | * | 6/1979 |
| JP | S54-71395 A | | 6/1979 |
| JP | S58-156575 | | 9/1983 |
| JP | H11-154604 A | | 6/1999 |
| JP | 2006-327883 | * | 12/2006 |
| JP | 2006-327883 A | | 12/2006 |

* cited by examiner

*Primary Examiner* — Carol M Koslow
(74) *Attorney, Agent, or Firm* — Drinker Biddle & Reath LLP

(57) ABSTRACT

Provided is a sintered ferrite magnet 10 that contains Sr ferrite having a hexagonal crystal structure, wherein the total amount of Na and K is 0.01 to 0.09% by mass in terms of $Na_2O$ and $K_2O$, an amount of Si is 0.1 to 0.29% by mass in terms of $SiO_2$, and the following Expression (1) is satisfied.

$$2.5 \leq (Sr_F + Ba + Ca + 2Na + 2K)/Si \leq 5.4 \qquad (1)$$

[In Expression (1), $Sr_F$ represents an amount of Sr, on a molar basis, other than Sr which constitutes the Sr ferrite, and Ba, Ca, Na, and K represent amounts of respective elements on a molar basis.]

5 Claims, 2 Drawing Sheets

SINTERED FERRITE MAGNET AND MOTOR PROVIDED THEREWITH

TECHNICAL FIELD

The present invention relates to a sintered ferrite magnet and a motor provided therewith.

BACKGROUND ART

As magnetic materials that are used in a sintered ferrite magnet, Ba ferrite, Sr ferrite, and Ca ferrite which have a hexagonal crystal structure are known. Recently, among these magnetic materials, as a magnet material for motors and the like, magnetoplumbite type (M type) Sr ferrite has been mainly employed. The M type ferrite is expressed by, for example, General Formula of $AFe_{12}O_{19}$. The Sr ferrite has Sr at an A site of the crystal structure.

To improve magnetic characteristics of the sintered ferrite magnet, improvement in the magnetic characteristic is attempted by substituting parts of an A-site element and a B-site element with a rare-earth element such as La, and Co, respectively. For example, Patent Literature 1 discloses a technology of improving a residual magnetic flux density (Br) and a coercive force (HcJ) by substituting parts of the A site and the B site with a specific amount of rare-earth element and Co.

As a representative use of the sintered ferrite magnet, a motor may be exemplified. The sintered ferrite magnet that is used in a motor is demanded to be excellent in both characteristics of Br and HcJ. However, generally, it is known that Br and HcJ are in a trade-off relationship. Therefore, it has been demanded to establish a technology capable of further improving both characteristics of the Br and the HcJ.

As an index representing magnetic characteristics in consideration of both characteristics of Br and HcJ, a calculation expression of Br+⅓HcJ is known (for example, refer to Patent Literature 1). As this value is high, it can be said that the sintered ferrite magnet is suitable for a use such as a motor in which high magnetic characteristics are demanded.

CITATION LIST

Patent Literature

[Patent Literature 1] Japanese Unexamined Patent Application Publication No. 11-154604

SUMMARY OF INVENTION

Technical Problem

As described in Patent Literature 1, it is effective to improve the magnetic characteristics by controlling a composition of main crystal grains that constitutes the sintered ferrite magnet. However, it is difficult to greatly improve the magnetic characteristics of the sintered ferrite magnet in the related art by controlling only the composition of crystal grains. On the other hand, some accessory components that are contained in the sintered ferrite magnet have an operation of improving the magnetic characteristics or sinterability. However, reliability in excellent strength, external appearance, and the like of the sintered ferrite magnet may be damaged depending on a kind of the accessory component or an amount thereof in some cases. For example, when using a sintered ferrite magnet having low strength or a sintered ferrite magnet in which foreign matter tends to precipitate on a surface thereof in a motor, there is a concern that the sintered ferrite magnet is broken, or peeled off and falls down during use of the motor. Therefore, a sintered ferrite magnet, which has not only the magnetic characteristics and but also high reliability, has been demanded.

The invention has been made in consideration of the above-described circumstances, and an object thereof is to provide a sintered ferrite magnet which is excellent in both characteristics of a residual magnetic flux density (Br) and a coercive force (HcJ), and which has high reliability. In addition, another object of the invention is to provide a motor which has high efficiency and which is excellent in reliability.

Solution to Problem

The present inventors have made an examination on improvement of magnetic characteristics by giving attention to the entire composition of the sintered ferrite magnet and a composition of a grain boundary in addition to a composition of a crystal grain. As a result, the present inventors have found that when a predetermined accessory component is contained, the magnetic characteristics and the reliability of the sintered ferrite magnet can be improved, and they have accomplished the invention.

That is, according to an aspect of the invention, there is provided a sintered ferrite magnet comprises Sr ferrite having a hexagonal crystal structure, wherein a total amount of Na and K is 0.01 to 0.09% by mass in terms of $Na_2O$ and $K_2O$, an amount of Si is 0.1 to 0.29% by mass in terms of $SiO_2$, and the following Expression (1) is satisfied.

$$2.5 \leq (Sr_F + Ba + Ca + 2Na + 2K)/Si \leq 5.4 \quad (1)$$

Here, in Expression (1), $Sr_F$ represents an amount of Sr, on a molar basis, other than Sr which constitutes the Sr ferrite, and Ba, Ca, Na, and K represent amounts of respective elements on a molar basis.

The sintered ferrite magnet of the invention is excellent in both characteristics of Br and HcJ and has high reliability. Although not apparent, the present inventors consider that the reason of obtaining these effects is because a grain boundary composition of the sintered ferrite magnet contributes to the effects. That is, it is considered that silicate glass, which contains Sr other than Sr that constitutes the Sr ferrite and at least one of Ba, Ca, Na, and K as a constituent element, is formed at the grain boundary of the sintered ferrite magnet. It is considered that the sintered ferrite magnet of the invention has a grain boundary composition in a ratio with which the silicate glass is stably formed. Accordingly, the sintered ferrite magnet tends to have a stable and dense structure, and thus it is considered that the sintered ferrite magnet has high Br and HcJ and high reliability.

In addition, it is preferable that the sintered ferrite magnet of the invention satisfy the following Expression (2). According to this, it is possible to further increase the value of Br +⅓HcJ. In addition, in Expression (2), $Sr_F$ represents an amount of Sr, on a molar basis, other than Sr which constitutes the Sr ferrite, and Ba, Ca, Na, and K represent amounts of respective elements on a molar basis.

$$3.2 \leq (Sr_F + Ba + Ca + 2Na + 2K)/Si \leq 3.5 \quad (2)$$

In addition, it is preferable that the sintered ferrite magnet of the invention satisfy the following Expression (3). According to this, the sintered ferrite magnet has more excellent magnetic characteristics.

$$Br + \tfrac{1}{3}HcJ \geq 5.2 \quad (3)$$

In Expression (3), Br and HcJ represent a residual magnetic flux density (kG) and a coercive force (kOe), respectively.

In the sintered ferrite magnet of the invention, it is preferable that an average grain size of crystal grains of the Sr ferrite be 1.0 μm or less, and a ratio of crystal grains, which have a grain size of 2.0 μm or more, on the number basis he 1% or less. According to this, it is possible to make the magnetic characteristics and the reliability be highly compatible with each other.

According to another aspect of the invention, there is provided a motor including the above-described sintered ferrite magnet. The motor includes the sintered ferrite magnet having the above-described characteristics, and thus the motor has both of high efficiency and high reliability.

Advantageous Effects of Invention

According to the invention, it is possible to provide a sintered ferrite magnet which is excellent in both characteristics of Br and HcJ and which has high reliability. In addition, it is possible to provide a motor which has high efficiency and which is excellent in reliability.

DESCRIPTION OF EMBODIMENTS

Hereinafter, a preferred embodiment of invention will be described in detail with reference to the attached drawings as necessary.

Figure 1:
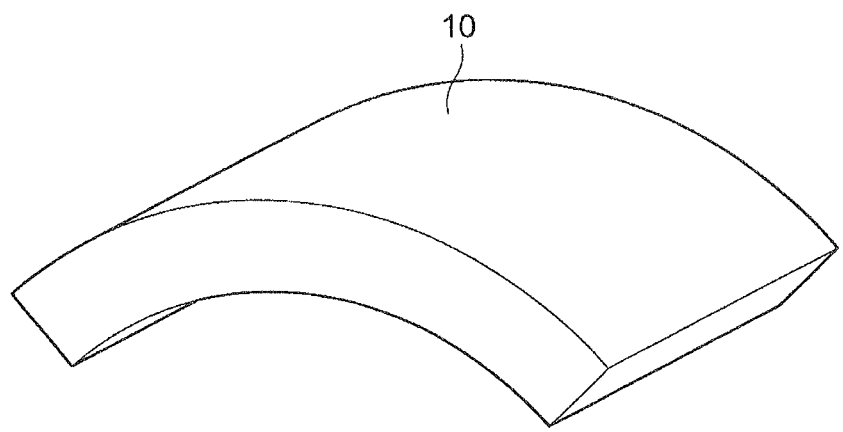
FIG. 1 is a perspective view schematically illustrating a preferred embodiment of a sintered ferrite magnet of the invention.

FIG. 1 is a perspective view schematically illustrating a sintered ferrite magnet of this embodiment. The sintered ferrite magnet 10 has a curved shape in which an end face has an arc shape. Generally, the sintered ferrite magnet 10 has a shape called an arc segment shape, a C shape, a roof tile shape, or a bow shape. For example, the sintered ferrite magnet 10 is suitably used as a magnet for motors.

The sintered ferrite magnet 10 is a sintered Sr ferrite magnet that contains M-type Sr ferrite having a hexagonal structure as a main component. For example, the Sr ferrite that is a main component is expressed by the following Formula (4).

$$SrFe_{12}O_{19} \qquad (4)$$

In the Sr ferrite of Expression (4), parts of A-site Sr and B-site Fe may be substituted with an impurity or an intentionally added element. In addition, a ratio between the A site and the B site may slightly deviate. In this case, the Sr ferrite may be expressed, for example, by the following General Formula (5).

$$R_xSr_{1-x}(Fe_{12-y}M_y)_zO_{19} \qquad (5)$$

In Formula (5), for example, x and y range from 0.1 to 0.5, and z ranges from 0.7 to 1.2.

For example, M in General Formula (5) represents one or more kinds of elements selected from the group consisting of Co (cobalt), Zn (zinc), Ni (nickel), Mn (manganese), Al (aluminum), and Cr (chromium). In addition, for example, R in General Formula (5) is a rare-earth element and represents one or more kinds of elements selected from the group consisting of La (lanthanum), Ce (cerium), Pr (praseodymium), Nd (neodymium), and Sm (samarium). In addition, in this case, $Sr_F$ can be calculated on the assumption that M and R constitute the Sr ferrite as expressed by General Formula (5).

A mass ratio of the Sr ferrite in the sintered ferrite magnet 10 is preferably 90% by mass or more, more preferably 95% by mass or more, and still more preferably 97% by mass or more. As described above, it is possible to further improve the magnetic characteristics by reducing the mass ratio of a crystal phase different from the Sr ferrite.

As an accessory component, the sintered ferrite magnet 10 contains a component different from the Sr ferrite. Examples of the accessory component include oxides. Examples of the oxides include oxides and composite oxides which have at least one kind of elements selected from the group consisting of K (potassium), Na (sodium), Si (silicon), Ca (calcium), Sr (strontium), and Ba (barium) as a constituent element. Examples of the oxides include $SiO_2$, $K_2O$, $Na_2O$, $CaO$, $SrO$, and $BaO$. In addition, silicate glass may be contained.

The total amount of Na and K in the sintered ferrite magnet 10 is 0.01 to 0.09% by mass in terms of $Na_2O$ and $K_2O$. The lower limit of the total amount of Na and K is preferably 0.02% by mass in terms of $Na_2O$ and $K_2O$, and more preferably 0.04% by mass. When the total amount of Na and K excessively decreases, a sintering temperature cannot be lowered, and thus there is a tendency that grain growth of crystal grains occurs and thus it is difficult to obtain sufficiently high magnetic characteristics.

The upper limit of the total amount of Na and K is preferably 0.075% by mass in terms of $Na_2O$ and $K_2O$. When the total amount of Na and K excessively increases, a white powder tends to be generated on a surface of the sintered ferrite magnet 10. When the powder is generated on the surface of the sintered ferrite magnet 10, for example, adhesion between a motor member and the sintered ferrite magnet 10 decreases, and thus there is a possibility that the sintered ferrite magnet 10 may be peeled from the motor member. That is, the reliability of the sintered ferrite magnet 10 deteriorates.

An amount of Si in the sintered ferrite magnet 10 is 0.1 to 0.29% by mass in terms of $SiO_2$. The lower limit of the amount of Si is 0.15% by mass in terms of $SiO_2$, and more preferably 0.2% by mass. When the amount of Si excessively decreases, a sintered body is not sufficiently densified, and thus the excellent magnetic characteristics tend to deteriorate. When the amount of Si excessively increases, the sufficiently excellent magnetic characteristics tend to deteriorate.

An amount of Sr in the sintered ferrite magnet 10 is preferably 10 to 13% by mass in terms of SrO from the viewpoint of further improving the magnetic characteristics and the reliability, and more preferably 10.2 to 11% by mass. In addition, an amount of Ba in the sintered ferrite magnet 10 is preferably 0.01 to 2.0% by mass in terms of BaO from the same viewpoint, and more preferably 0.01 to 0.2% by mass.

An amount of Ca in the sintered ferrite magnet 10 is preferably 0.05 to 0.5% by mass in terms of CaO from the viewpoint of further improving the magnetic characteristics and the reliability, and more preferably 0.1 to 03% by mass. In addition, in addition to these components, impurities that are contained in a raw material, or unavoidable components that are derived from a manufacturing facility may be contained in the sintered ferrite magnet 10. Examples of the impurities and the unavoidable components include oxides of Ti (titanium), Cr (chromium), Mn (manganese), Mo (molybdenum), V (vanadium), Al (aluminum), and the like.

The accessory component is mainly contained in a grain boundary of crystal grains of the Sr ferrite in the sintered ferrite magnet 10. When a ratio of respective elements that are included in the accessory component varies, a composition of a grain boundary varies. As a result, this variation may have an effect on the magnetic characteristics and the reliability of the sintered ferrite magnet 10. When a ratio of a specific element that is included in the accessory component is adjusted in a predetermined range, the sintered ferrite magnet 10 of this embodiment has excellent magnetic characteristics and the high reliability. In addition, the amount of respective components of the sintered ferrite magnet 10 can be measured by fluorescent X-ray analysis and inductively coupled plasma emission spectroscopic analysis (ICP analysis).

From the viewpoint of further improving the magnetic characteristics and the reliability, the sintered ferrite magnet 10 satisfies the following Expression (1), preferably the following Expression (1)', more preferably the following Expression (6), still more preferably the following Expression (7), and still more preferably the following Expression (2).

$$2.5 \leq (Sr_F + Ba + Ca + 2Na + 2K)/Si \leq 5.4 \quad (1)$$

$$2.5 \leq (Sr_F + Ba + Ca + 2Na + 2K)/Si \leq 4.1 \quad (1)'$$

$$2.7 \leq (Sr_F + Ba + Ca + 2Na + 2K)/Si \leq 4.0 \quad (6)$$

$$2.8 \leq (Sr_F + Ba + Ca + 2Na + 2K)/Si \leq 3.8 \quad (7)$$

$$3.2 \leq (Sr_F + Ba + Ca + 2Na + 2K)/Si \leq 3.5 \quad (2)$$

In Expression (1), Expression (1)', Expression (2), Expression (6), and Expression (7), $Sr_F$ represents an amount of Sr, on a molar basis, other than Sr which constitutes the Sr ferrite, and Ba, Ca, Na, and K represent amounts of respective elements on a molar basis. $Sr_F$ is created in a case where a ratio of a Sr source to an Fe source is made to be more than a stoichiometric ratio of the Sr ferrite [$SrFe_{12}O_{19}$ or $R_xSr_{1-x}(Fe_{12-y}M_y)_zO_{19}$] during a process of manufacturing the sintered ferrite magnet 10. In a case where the amount of Sr is less than the stoichiometric ratio of the Sr ferrite [$SrFe_{12}O_{19}$ or $R_xSr_{1-x}(Fe_{12-y}M_y)_zO_{19}$], the $Sr_F$ becomes a numerical value less than 0, that is, a negative numerical value. In this case, it is also preferable to satisfy the above-described Expressions.

It is considered that silicate glass containing the element, which is exemplified as an accessory component, as a constituent element is generated at a grain boundary of the sintered ferrite magnet 10. It is considered that when the sintered ferrite magnet 10 satisfies Expression (1), Expression (1)', Expression (2), Expression (6), or Expression (7), a composition of the grain boundary is stabilized, and this stabilization contributes to improvement in the magnetic characteristics and the reliability.

An average grain size of crystal grains of the Sr ferrite in the sintered ferrite magnet 10 is preferably 2.0 μm or less, more preferably 1.0 μm or less, and still more preferably 0.3 μm to 1.0 μm. When the average grain size of crystal grains of the Sr ferrite exceeds 2.0 μm, there is a tendency that it is difficult to obtain sufficiently excellent magnetic characteristics. On the other hand, it is difficult to manufacture a sintered ferrite magnet in which the average grain size of crystal grains of the Sr ferrite is less than 0.3 μm.

The average grain size of crystal grains of the Sr ferrite of the sintered ferrite magnet 10 can be measured by using a SEM or a TEM. In the case of performing the measurement by the SEM, a cross-section of the sintered ferrite magnet is mirror-polished, and the cross-section is etched with an acid such as hydrofluoric acid. Then, the resultant etched surface is observed with the SEM. In a SEM or TEM observation image including several hundreds of crystal grains, a contour of crystal grains is made to be clear, and image processing and the like are performed. Then, a grain size distribution of a c-plane is measured. "Grain size" in this specification represents the major axis (diameter in an a-axis direction) in an a-plane. The major axis is obtained as the longest side of a "rectangle with the smallest area" which circumscribes each of the crystal grains. In addition, a ratio of the longest side to the shortest side in the "rectangular with the smallest area" is an "aspect ratio". In addition, a so-called thermal etching in which a sample is heated and etched may be performed instead of the etching with the acid.

From the measured grain size distribution on the number basis, an average value of the grain size of crystal grains on the number basis is calculated. In addition, a standard deviation is calculated from the grain size distribution and the average value which are measured. In this specification, the average value and the grain size distribution are set as an average grain size of crystal grains of the Sr ferrite and a standard deviation thereof. It is preferable that a ratio of crystal grains having a grain size of 2 μm or more to the entirety of crystal grains of the Sr ferrite on the number basis be 1% or less, and more preferably 0.9% or less. According to this, it is possible to obtain a sintered ferrite magnet having sufficiently high magnetic characteristics. From the same viewpoint, it is preferable that a number average value (average aspect ratio) of the aspect ratio of respective crystal grains be approximately 1.0.

It is preferable that the sintered ferrite magnet 10 satisfy the following Expression (3), and more preferably the following Expression (8). Crystal grains of the Sr ferrite in the sintered ferrite magnet 10 of this embodiment are sufficiently fine and the sintered ferrite magnet has a specific composition, and thus high magnetic characteristics which satisfy Expression (3) or Expression (8) are obtained. A sintered ferrite magnet, which satisfies Expression (3) or Expression (8), has sufficiently excellent magnetic characteristics. It is possible to provide a motor having further higher efficiency with such a sintered ferrite magnet.

$$Br + \tfrac{1}{3}HcJ \geq 5.2 \quad (3)$$

$$Br + \tfrac{1}{3}HcJ \geq 5.3 \quad (8)$$

In Expression (3) and Expression (8), Br and HcJ represent a residual magnetic flux density (kG) and a coercive force (kOe), respectively.

Figure 2:
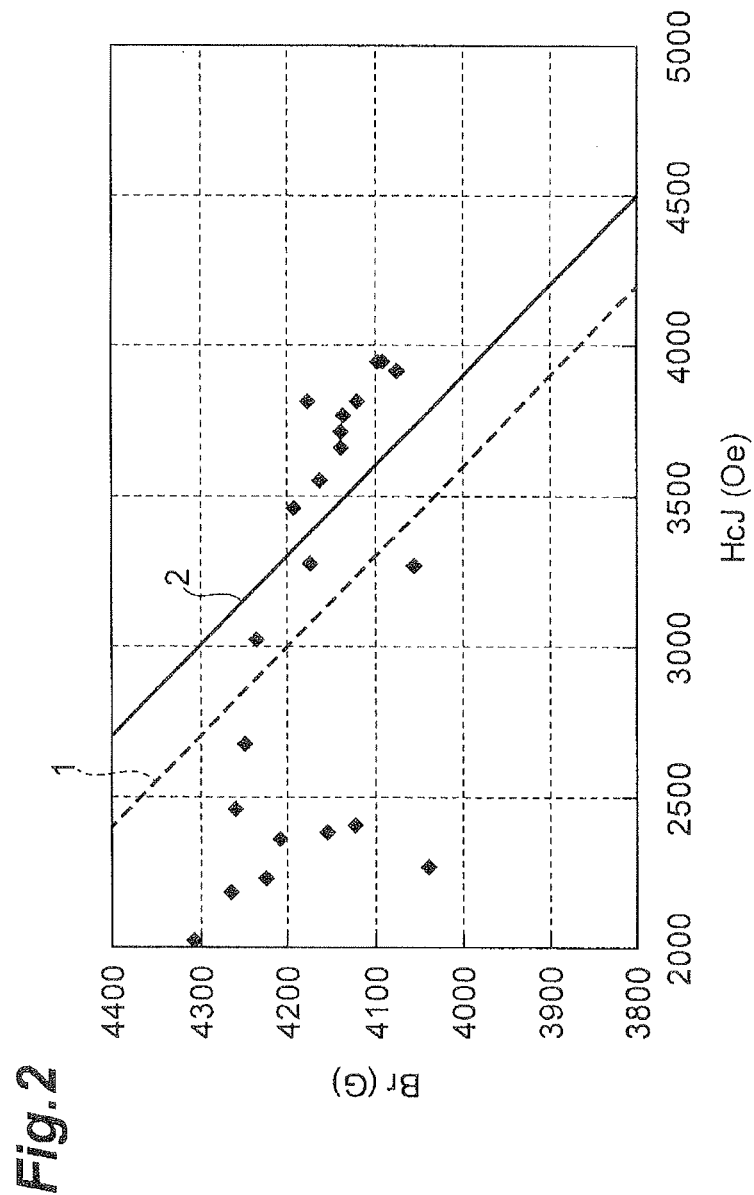
FIG. 2 is a graph obtained by plotting a relationship between Br (G) and HcJ (Oe) of a plurality of sintered ferrite magnets in Examples and Comparative Examples of the invention.

FIG. 2 is a graph obtained by plotting a relationship between Br (G) and HcJ (Oe) of a plurality of sintered ferrite magnets in Examples and Comparative Examples of the invention. In FIG. 2, only data satisfying a relationship of Hk/HcJ>90% is plotted. As can be seen from FIG. 2, in a sintered ferrite magnet, magnetic characteristics such as Br and HcJ typically vary due to a change in manufacturing conditions such as a composition, addition conditions, and a firing temperature. In addition, the Br and the HcJ are in a trade-off relationship. In addition, the Br and the HcJ vary in accordance with a predetermined gradient (Br+⅓HcJ). It is preferable that the sintered ferrite magnet 10 have magnetic characteristics (Br, HcJ) on a dotted line 1 (Br+⅓HcJ=5.2)

in FIG. 2, or an upper right side of the dotted line 1, and more preferably magnetic characteristics (Br, HcJ) on a straight line 2 (Br+⅓HcJ=5.3), or an upper right side of the straight line 2.

For example, the sintered ferrite magnet 10 may be used as a magnet of motors for vehicles such as motors for a fuel pump, a power window, an anti-lock brake system (ABS), a fan, a wiper, power steering, an active suspension, a starter, a door lock, and an electric mirror. In addition, the sintered ferrite magnet 10 may also be used as a magnet of motors for OA/AV apparatuses such as motors for an FDD spindle, a VTR capstan, a VTR rotary head, a VTR reel, VTR loading, a VTR camera capstan, a VTR camera rotary head, VTR camera zooming, VTR camera focusing, a radio cassette recorder capstan, a CD/DVD/MD spindle, CD/DVD/MD loading, and CD/DVD optical pickup. Furthermore, the sintered ferrite magnet 10 may also be used as a magnet of motors for household electrical appliances such as motors for a compressor of an air-conditioner, a compressor of a freezer, electric tool driving, a drier fan, shaver driving, and an electric toothbrush. Furthermore, the sintered ferrite magnet 10 may also be used as a magnet of motors for FA apparatuses such as motors for driving of a robot shaft and a joint, main driving of a robot, driving of a machine tool table, and driving of a machine tool belt.

The sintered ferrite magnet 10 is bonded to the above-described motor member and is provided inside the motor. In the sintered ferrite magnet 10 having excellent magnetic characteristics, generation of a crack and generation of foreign matter (white powder) on a surface are sufficiently suppressed, and thus the sintered ferrite magnet 10 is bonded to the motor member in a sufficiently strong manner. As described above, it is possible to sufficiently suppress the sintered ferrite magnet 10 from being peeled from the motor member. Accordingly, various motors provided with the sintered ferrite magnet 10 have both of high efficiency and high reliability.

The use of the sintered ferrite magnet 10 is not limited to the motors, and the sintered ferrite magnet 10 may be used, for example, as a member such as a generator for motorcycles, a magnet for speakers and headphones, a magnetron tube, a magnetic field generating apparatus for an MRI, a damper for a CD-ROM, a sensor for a distributor, a sensor for an ABS, a fuel and oil level sensor, a magnet latch, and an isolator. In addition, the sintered ferrite magnet 10 may be used as a target (pellet) during formation of a magnetic layer of a magnetic recording medium by a deposition method, a sputtering method, and the like.

Next, a method of manufacturing the sintered ferrite magnet 10 will be described. The method of manufacturing the sintered ferrite magnet 10 includes a blending process, a calcination process, a pulverization process, a molding process in a magnetic field, and a firing process. Hereinafter, details of the respective processes will be described.

The blending process is a process of preparing a mixed powder for calcination. In the blending process, first, starting raw materials are weighed and are blended in a predetermined ratio, and then are mixed with a wet-type attritor, a ball mill, and the like for 1 hour to 20 hours. Pulverization is also performed during the mixing. As the starting raw materials, compounds having constituent elements of the Sr ferrite that is a main component are prepared.

In the blending process, powders such as $SiO_2$, $CaCO_3$, $Na_2CO_3$, and $K_2CO_3$ which are accessory components may be added. As a compound that has a constituent element of Na or K, a silicate or an organic compound (dispersing agent) that contains Na or K may be used in addition to a carbonate.

As the compounds that have the constituent elements of the Sr ferrite, compounds such as oxides, and carbonates, hydroxides, and nitrites which become oxides by firing may be used. Examples of the compounds include $SrCO_3$, $La(OH)_3$, $Fe_2O_3$, $Co_3O_4$, and the like. An average particle size of the starting raw material is not particularly limited. For example, the average particle size is 0.1 µm to 2.0 µm. It is not necessary to mix all of the starting raw materials in the blending process before the calcination, and parts of the respective compound or the entirety thereof may be added after the calcination.

The calcination process is a process of calcining the raw material composition that is obtained in the blending process. The calcination can be performed in an oxidizing atmosphere such as in the air. A calcination temperature is preferably 800° C. to 1450° C., more preferably 850° C. to 1300° C., and still more preferably 900° C. to 1200° C. A calcination time at the calcination temperature is preferably 1 second to 10 hours, and more preferably 1 minute to 3 hours. An amount of the Sr ferrite in a calcined material that can be obtained by the calcination is preferably 70% by mass or more, and more preferably 90% by mass or more. A primary particle size of the calcined material is preferably 10 µm or less, and more preferably 2.0 µm or less.

The pulverization process is a process of pulverizing the calcined material to obtain a powder of a ferrite magnet. The pulverization process may be performed in a single step, or in two steps divided into a rough pulverization process and a fine pulverization process. Typically, the calcined material is present in a granular shape or an agglomerated shape and thus it is preferable to perform the rough pulverization process at first. In the rough pulverization process, pulverization is performed in a dry type by using a vibration rod mill and the like to prepare a pulverized powder having an average particle size of 0.5 µm to 5.0 µm. The pulverized powder that is prepared in this manner is wet-pulverized by using a wet-type attritor, a ball mill, a jet mill, and the like to obtain a fine powder having an average particle size of 0.08 µm to 2.0 µm, more preferably 0.1 µm to 1.0 µm, and still more preferably 0.2 µm to 0.8 µm.

A specific surface area of the fine powder in accordance with a BET method is preferably 5 to 14 $m^2/g$, and more preferably 7 to 12 $m^2/g$. For example, in the case of using the wet-type attritor, a pulverization time is 30 minutes to 10 hours, and in the case of using the ball mill, the pulverization time is 5 to 50 hours. It is preferable that the pulverization time he appropriately adjusted in accordance with a pulverization method.

In the pulverization process, powders such as $CaCO_3$, $SrCO_3$, and $BaCO_3$ may be added in addition to at least one kind of powders such as $SiO_2$, $Na_2CO_3$, and $K_2CO_3$ which are accessory components. As a compound that has a constituent element of Na or K, a silicate or an organic compound (dispersing agent) that contains Na or K may be used in addition to a carbonate. When adding the accessary components, it is possible to improve sinterability and magnetic characteristics. In addition, in the case of performing wet molding, the accessory components may flow out together with a solvent of slurry, and thus it is preferable to blend the accessory component in an amount more than a target amount in a sintered ferrite magnet.

To increase a magnetic orientation degree of the sintered ferrite magnet, it is preferable to add polyhydric alcohol in the fine pulverization process in addition to the above-described accessory component. An added amount of the polyhydric alcohol is 0.05 to 5.0% by mass with respect to materials to be added, preferably 0.1 to 3.0% by mass, and more preferably 0.3 to 2.0% by mass. In addition, the added polyhydric alcohol is removed by thermal decomposition in the firing process after the molding process in a magnetic field.

The molding process in a magnetic field is a process of molding the fine powder, which is obtained in the pulverization process, in a magnetic field to prepare a molded body. The molding process in a magnetic field may be performed by either dry molding or wet molding. However, the wet molding is preferable from the viewpoint of increasing the magnetic orientation degree. In the case of performing the wet molding, the slurry, which is obtained by performing the fine pulverization process in a wet manner, may be adjusted to have a predetermined concentration, and the slurry may be set as slurry for wet molding. Concentration of the slurry may be performed by centrifugal separation, filter pressing and the like.

An amount of the fine powder in the slurry for wet molding is preferably 30 to 85% by mass. Water or non-aqueous solvent may be used as a dispersion medium of the slurry. In addition to water, surfactants such as gluconic acid, gluconate, and sorbitol may be added to the slurry for wet molding. The molding in a magnetic field is performed by using the slurry for wet molding. A molding pressure is, for example, 0.1 to 0.5 ton/cm$^2$, and an applied magnetic field is, for example, 5 to 15 kOe.

The firing process is a process of firing the molded body to obtain a sintered body. The firing process is typically performed in an oxidizing atmosphere such as in the air. A firing temperature is preferably 1050 to 1300° C., and more preferably 1150 to 1250° C. A firing time at the firing temperature is preferably 0.5 to 3 hours. Through the above-described processes, it is possible to obtain a sintered body, that is, a sintered ferrite magnet 10. In addition, the method of manufacturing the sintered ferrite magnet of the invention is not limited to the above-described method.

Hereinbefore, a preferred embodiment of the invention has been described, but the sintered ferrite magnet and the motor of the invention are not limited to the above-described sintered ferrite magnet and motor. For example, the shape of the sintered ferrite magnet is not limited to the shape in FIG. 1, and may be appropriately modified into a shape that is suitable for the above-described uses.

EXAMPLES

The contents of the invention will be described in more detail with reference to Examples and Comparative Examples, but the invention is not limited to the following Examples.

Examples 1 to 8, and Comparative Examples 1 to 17

(Preparation of Sintered Ferrite Magnet)
First, the following starting raw materials were prepared.
Fe$_2$CO$_3$ powder (primary particle size: 0.3 μm)
SrCO$_3$ powder (primary particle size: 2 μm)
SiO$_2$ powder (primary particle size: 0.01 μm)
CaCO$_3$ powder
Na$_2$CO$_3$ powder 1000 g of Fe$_2$CO$_3$ powder, 161.2 g of SrCO$_3$ powder, and 2.3 g of SiO$_2$ powder were mixed while pulverizing the powders by using a wet attritor, and then drying and granulation were performed. The resultant powder that was obtained in this manner was fired in the air at 1250° C. for 3 hours, thereby obtaining a granular calcined material. The calcined material was roughly pulverized by using a dry vibration rod mill, thereby preparing a powder having a specific surface area of 1 m$^2$/g in accordance with a BET method.

Sorbitol, the SiO$_2$ powder and the CaCO$_3$ powder were added to 130 g of roughly pulverized powder in a predetermined amount, and then wet pulverization was performed for 21 hours by using a ball mill to obtain slurry. An added amount of the sorbitol was 1% by mass on the basis of the mass of the roughly pulverized powder. The specific surface area of a fine powder contained in the slurry was 6 m$^2$/g to 8 m$^2$/g. The Na$_2$CO$_3$ powder was added to the slurry after completion of the pulverization in a predetermined amount, and then stirring was performed. Then, a concentration of a solid content of the slurry was adjusted, and molding was performed by using a wet magnetic field molding machine in an applied magnetic field of 12 kOe, thereby obtaining a molded body. Four pieces of molded bodies were prepared. The molded bodies were fired in the air at 1180° C., 1200° C., 1220° C., and 1240° C., respectively, thereby obtaining four kinds of cylindrical sintered ferrite magnets in which firing temperatures were different from each other. The molded bodies were fired in the air at 1180° C. to 1240° C., thereby obtaining cylindrical sintered ferrite magnets. In this manner, sintered ferrite magnets of Example 1 were prepared. In addition, sintered ferrite magnets of Examples 2 to 8 and Comparative Examples 1 to 17, which had a composition different from that of Example 1, were prepared in the same manner as Example 1 except that an added amount of the SiO$_2$ powder and the CaCO$_3$ powder during preparation of slurry, and an added amount of the Na$_2$CO$_3$ powder to the slurry were changed. In respective Examples and Comparative Examples, four kinds of sintered ferrite magnets, in which firing temperatures were different from each other, were prepared.

(Evaluation of Sintered Ferrite Magnet)
<Composition Analysis>

The composition of the prepared sintered ferrite magnets of respective Examples and Comparative Examples was measured by inductively coupled plasma emission spectroscopic analysis (ICP analysis) and fluorescent X-ray analysis. In the sintered ferrite magnets, elements (Ba and the like), which were derived from impurities contained in the starting raw materials, were detected in addition to Fe, Sr, Si, and Ca. Tables 1 and 2 show respective amounts of Na, Al, K, Si, Ca, Cr, Mn, Fe, Ni, Sr, and Ba which were detected in terms of Na$_2$O, Al$_2$O$_3$, K$_2$O, SiO$_2$, CaO, Cr$_2$O$_3$, MnO, Fe$_2$O$_3$, NiO, SrO, and BaO. Each of the amounts is a value (% by mass) on the basis of the entirety of the sintered ferrite magnet. In addition, the reason why the total value of the amounts is not 100% by mass is that each of the sintered ferrite magnets contains a minor component such as an impurity in addition to the above-described components, and oxidation numbers of constituent elements of respective oxides may be different in some cases.

An amount of Sr, which constitutes an A site of the Sr ferrite expressed by General Formula (5), was calculated on the basis of the amount of Fe, Al, Cr, Mn, and Ni on the assumption that Al, Cr, Mn, and Ni, which are detected by the above-described composition analysis, constitute a B site of the Sr ferrite expressed by General Formula (5) in combination with Fe. A rare-earth element R was not contained, and thus x in General Formula (5) is 0. In addition, an amount (% by mass) of Sr (Sr$_F$), which does not constitute the Sr ferrite, was obtained by subtracting the amount of Sr constituting the A site, which was calculated as described above, from the amount of Sr that was obtained by the above-described composition analysis. The amount (% by mass) of Sr, which does not constitute the Sr ferrite, and the amount (% by mass) of Ba, Ca, and Na were converted in a molar basis, and a molar ratio a [=$Sr_F$+Ba+Ca+2Na+2K]/Si] was obtained. These results are shown in Tables 1 and 2.

<Evaluation of External Appearance>

Each of the ferrite magnets that were prepared was left as it was in the air for 7 days, and the surface of the ferrite magnet was observed with the naked eye. Evaluation was performed on the basis of the following criteria. Evaluation results are shown in Tables 1 and 2.

A: Crack did not occur on a surface of a magnet and a white powder was not generated thereon.

B: Crack occurred on the surface of the magnet, but the white powder was not generated thereon.

C: Crack occurred on the surface of the magnet, and the white powder adhered to the surface.

<Evaluation of Magnetic Characteristics>

An upper surface and a lower surface of each of the prepared cylindrical sintered ferrite magnets were processed, and then the magnetic characteristics were measured by using a B-H tracer in which a maximum applied magnetic field was 25 kOe. During the measurement, Br, HcJ, bHc, 4$PI_{max}$, and $(BH)_{max}$ were obtained, and an external magnetic field intensity (Hk) when reaching 90% of the Br was measured. On the basis of the measured values, Hk/HcJ (%) was obtained. In respective Examples and Comparative Examples, magnetic characteristics of sintered ferrite magnets, among the sintered ferrite magnets prepared at respective firing temperatures of 1180° C., 1200° C. 1220° C., and 1240° C., which satisfy a relationship of Hk/HcJ >90% and which shows the highest "Br+⅓HcJ" are shown in Tables 1 and 2 in combination with firing temperatures.

TABLE 1

| | Na$_2$O mass % | Al$_2$O$_3$ mass % | K$_2$O mass % | SiO$_2$ mass % | CaO mass % | Cr$_2$O$_3$ mass % | MnO mass % | Fe$_2$O$_3$ mass % | NiO mass % | SrO mass % | BaO mass % |
|---|---|---|---|---|---|---|---|---|---|---|---|
| Example1 | 0.074 | 0.092 | 0.001 | 0.260 | 0.103 | 0.080 | 0.572 | 88.2 | 0.020 | 10.5 | 0.054 |
| Example2 | 0.010 | 0.091 | 0.001 | 0.270 | 0.208 | 0.080 | 0.568 | 88.2 | 0.022 | 10.5 | 0.051 |
| Example3 | 0.042 | 0.090 | 0.001 | 0.268 | 0.206 | 0.080 | 0.565 | 88.1 | 0.023 | 10.5 | 0.060 |
| Example4 | 0.075 | 0.090 | 0.001 | 0.256 | 0.206 | 0.081 | 0.570 | 88.1 | 0.023 | 10.5 | 0.056 |
| Example5 | 0.075 | 0.092 | 0.001 | 0.260 | 0.420 | 0.078 | 0.565 | 87.9 | 0.022 | 10.4 | 0.055 |
| Example6 | 0.011 | 0.090 | 0.001 | 0.150 | 0.080 | 0.078 | 0.561 | 88.4 | 0.023 | 10.4 | 0.060 |
| Example7 | 0.085 | 0.091 | 0.001 | 0.150 | 0.070 | 0.079 | 0.570 | 88.4 | 0.021 | 10.3 | 0.060 |
| Example8 | 0.002 | 0.090 | 0.081 | 0.256 | 0.206 | 0.080 | 0.567 | 88.1 | 0.022 | 10.5 | 0.056 |
| Comp. Ex. 1 | 0.002 | 0.092 | 0.001 | 0.274 | 0.098 | 0.078 | 0.566 | 88.2 | 0.024 | 10.5 | 0.060 |
| Comp. Ex. 2 | 0.002 | 0.094 | 0.001 | 0.276 | 0.411 | 0.077 | 0.568 | 88.0 | 0.022 | 10.4 | 0.050 |
| Comp. Ex. 3 | 0.002 | 0.089 | 0.001 | 0.258 | 0.624 | 0.074 | 0.561 | 87.8 | 0.023 | 10.4 | 0.056 |
| Comp. Ex. 4 | 0.002 | 0.090 | 0.001 | 0.274 | 0.098 | 0.082 | 0.572 | 88.3 | 0.023 | 10.5 | 0.058 |
| Comp. Ex. 5 | 0.146 | 0.091 | 0.001 | 0.261 | 0.104 | 0.079 | 0.572 | 88.1 | 0.024 | 10.5 | 0.058 |
| Comp. Ex. 6 | 0.103 | 0.095 | 0.001 | 0.261 | 0.211 | 0.076 | 0.565 | 88.0 | 0.020 | 10.5 | 0.055 |
| Comp. Ex. 7 | 0.141 | 0.092 | 0.001 | 0.261 | 0.216 | 0.078 | 0.570 | 88.0 | 0.023 | 10.5 | 0.055 |

| | Molar ratio a | Firing Temp. ° C. | Br G | bHc Oe | HcJ Oe | $(BH)_{max}$ MGOe | 4$PI_{max}$ G | Br/4$PI_{max}$ % | Hk/HcJ % | Br + ⅓HcJ | Appearance |
|---|---|---|---|---|---|---|---|---|---|---|---|
| Example1 | 3.55 | 1220 | 4140 | 3558 | 3662 | 4.17 | 4268 | 97.0 | 95.9 | 5.36 | A |
| Example2 | 2.92 | 1200 | 4162 | 3451 | 3552 | 4.20 | 4315 | 96.5 | 95.6 | 5.35 | A |
| Example3 | 3.43 | 1220 | 4192 | 3372 | 3460 | 4.26 | 4333 | 96.7 | 95.4 | 5.35 | A |
| Example4 | 4.08 | 1180 | 4076 | 3727 | 3913 | 4.03 | 4237 | 96.2 | 95.7 | 5.38 | A |
| Example5 | 4.72 | 1200 | 4234 | 2933 | 3022 | 4.29 | 4363 | 97.1 | 92.0 | 5.24 | A |
| Example6 | 3.91 | 1220 | 4163 | 3550 | 3650 | 4.20 | 4314 | 96.5 | 95.6 | 5.38 | A |
| Example7 | 5.36 | 1200 | 4167 | 3564 | 3653 | 4.21 | 4309 | 96.7 | 95.9 | 5.38 | A |
| Example8 | 3.77 | 1180 | 4076 | 3729 | 3933 | 4.03 | 4237 | 96.2 | 95.7 | 5.39 | A |
| Comp. Ex. 1 | 2.33 | 1220 | 4041 | 2200 | 2266 | 3.93 | 4176 | 96.8 | 91.6 | 4.80 | A |
| Comp. Ex. 2 | 3.35 | 1200 | 4258 | 2361 | 2459 | 4.19 | 4408 | 96.6 | 83.7 | 5.08 | A |
| Comp. Ex. 3 | 4.53 | 1180 | 4224 | 2193 | 2227 | 4.03 | 4364 | 96.8 | 81.4 | 4.97 | A |
| Comp. Ex. 4 | 2.30 | 1220 | 4218 | 1818 | 1842 | 3.97 | 4334 | 97.3 | 91.9 | 4.83 | A |
| Comp. Ex. 5 | 4.64 | 1200 | 4096 | 3730 | 3944 | 4.06 | 4234 | 96.7 | 94.6 | 5.41 | C |
| Comp. Ex. 6 | 4.46 | 1200 | 4136 | 3575 | 3771 | 4.13 | 4288 | 96.5 | 93.6 | 5.39 | C |
| Comp. Ex. 7 | 5.05 | 1180 | 4092 | 3735 | 3945 | 4.06 | 4250 | 96.3 | 95.1 | 5.41 | C |

TABLE 2

| | Na$_2$O mass % | Al$_2$O$_3$ mass % | K$_2$O mass % | SiO$_2$ mass % | CaO mass % | Cr$_2$O$_3$ mass % | MnO mass % | Fe$_2$O$_3$ mass % | NiO mass % | SrO mass % | BaO mass % |
|---|---|---|---|---|---|---|---|---|---|---|---|
| Comp. Ex. 8 | 0.108 | 0.090 | 0.001 | 0.261 | 0.417 | 0.080 | 0.564 | 87.8 | 0.023 | 10.4 | 0.061 |
| Comp. Ex. 9 | 0.113 | 0.091 | 0.001 | 0.261 | 0.418 | 0.077 | 0.571 | 87.9 | 0.023 | 10.5 | 0.060 |
| Comp. Ex. 10 | 0.008 | 0.091 | 0.001 | 0.273 | 0.638 | 0.078 | 0.563 | 87.7 | 0.022 | 10.5 | 0.059 |
| Comp. Ex. 11 | 0.069 | 0.096 | 0.001 | 0.258 | 0.637 | 0.076 | 0.560 | 87.7 | 0.020 | 10.4 | 0.054 |
| Comp. Ex. 12 | 0.076 | 0.089 | 0.001 | 0.261 | 0.641 | 0.082 | 0.559 | 87.7 | 0.022 | 10.4 | 0.060 |
| Comp. Ex. 13 | 0.133 | 0.089 | 0.001 | 0.260 | 0.645 | 0.078 | 0.565 | 87.5 | 0.020 | 10.5 | 0.055 |
| Comp. Ex. 14 | 0.240 | 0.091 | 0.001 | 0.260 | 0.101 | 0.081 | 0.560 | 87.9 | 0.021 | 10.5 | 0.060 |
| Comp. Ex. 15 | 0.572 | 0.094 | 0.001 | 0.265 | 0.101 | 0.077 | 0.563 | 87.5 | 0.020 | 10.4 | 0.061 |

TABLE 2-continued

| | Molar ratio a | Firing Temp. °C. | Br G | bHc Oe | HcJ Oe | $(BH)_{max}$ MGOe | $4PI_{max}$ G | Br/$4PI_{max}$ % | Hk/HcJ % | Br + ⅓HcJ | Appearance |
|---|---|---|---|---|---|---|---|---|---|---|---|
| Comp. Ex. 16 | 0.055 | 0.085 | 0.001 | 0.463 | 0.858 | 0.078 | 0.561 | 87.3 | 0.024 | 10.4 | 0.056 |
| Comp. Ex. 17 | 0.089 | 0.087 | 0.001 | 0.462 | 0.854 | 0.076 | 0.562 | 87.2 | 0.023 | 10.5 | 0.055 |
| Comp. Ex. 8 | 5.21 | 1180 | 4174 | 3195 | 3280 | 4.23 | 4318 | 96.7 | 94.2 | 5.27 | C |
| Comp. Ex. 9 | 5.49 | 1180 | 4057 | 3105 | 3273 | 3.99 | 4202 | 96.6 | 91.2 | 5.15 | C |
| Comp. Ex. 10 | 4.66 | 1180 | 4265 | 2082 | 2181 | 4.06 | 4395 | 97.1 | 78.6 | 4.99 | A |
| Comp. Ex. 11 | 5.61 | 1180 | 4207 | 2321 | 2359 | 4.17 | 4335 | 97.0 | 91.2 | 4.99 | A |
| Comp. Ex. 12 | 5.69 | 1180 | 4155 | 2323 | 2387 | 4.10 | 4288 | 96.9 | 90.6 | 4.95 | C |
| Comp. Ex. 13 | 6.83 | 1180 | 4122 | 2329 | 2411 | 4.03 | 4254 | 96.9 | 89.9 | 4.93 | C |
| Comp. Ex. 14 | 6.10 | 1200 | 4175 | 3483 | 3813 | 4.10 | 4309 | 96.9 | 88.1 | 5.45 | C |
| Comp. Ex. 15 | 10.71 | 1180 | 4120 | 3098 | 3813 | 4.05 | 4279 | 96.3 | 68.4 | 5.39 | C |
| Comp. Ex. 16 | 3.58 | 1180 | 4130 | 2761 | 2835 | 4.14 | 4269 | 96.8 | 93.5 | 5.08 | A |
| Comp. Ex. 17 | 4.00 | 1180 | 4112 | 3115 | 3181 | 4.10 | 4268 | 96.3 | 94.4 | 5.17 | A |

As shown in Tables 1 and 2, in the sintered ferrite magnets of Examples, the crack did not occur and the white powder was not generated, and a value of the "Br+⅓HcJ" was 5.2 or more. In addition, in a sintered ferrite magnet in which the total amount of $Na_2O$ and $K_2O$ was more than 0.09% by mass, it was confirmed that a crack tended to occur, and when the sintered ferrite magnet was left as it was in the air for a predetermined period of time, the white powder precipitated in some cases. In addition, when a ratio of the molar ratio a was too large or too small, a phenomenon in which the magnetic characteristics decreased was confirmed.

A cross-section (a-plane) of the sintered ferrite magnets of Examples 1 to 8 was mirror-polished and then the cross-section was etched with a hydrofluoric acid. Then, the resultant etched surface was observed with an FE-SEM. A contour of crystal grains of the Sr ferrite in observed images was made to be clear, and then a grain size distribution of crystal grains of the Sr ferrite on the number basis was measured by image processing.

From grain size distribution data, an average grain size of crystal grains of the Sr ferrite on the number basis and a standard deviation thereof were obtained. As a result, in all of the sintered ferrite magnets, the average grain size of the sintered ferrite magnets of Examples 1 to 8 was 1.0 μm or less, and the standard deviation thereof was 0.42 or less. In addition, in all of the sintered ferrite magnets, a ratio of crystal grains having a grain size of 2.0 μm or more to the entirety of crystal grains of the Sr ferrite on the number basis was 1% or less. As described above, it was confirmed that the crystal grains of the Sr ferrite contained in the sintered ferrite magnets of Examples 1 to 8 were sufficiently fine, and had high uniformity.

INDUSTRIAL APPLICABILITY

According to the invention, it is possible to provide a sintered ferrite magnet which is excellent in both characteristics of Br and HcJ and which has high reliability. In addition, it is possible to provide a motor which has high efficiency and is excellent in reliability.

REFERENCE SIGNS LIST

10: Sintered ferrite magnet

The invention claimed is:

1. A sintered ferrite magnet, containing:
   M-type Sr ferrite having a hexagonal crystal structure,
   wherein a total amount of Na and K is 0.01 to 0.09% by mass in terms of $Na_2O$ and $K_2O$,
   an amount of Si is 0.1 to 0.29% by mass in terms of $SiO_2$, and
   the following Expression (1) is satisfied:

$$2.5 \leq (Sr_F+Ba+Ca+2Na+2K)/Si \leq 5.4 \quad (1),$$

wherein in Expression (1), $Sr_F$ represents an amount of Sr, on a molar basis, other than Sr which constitutes the Sr ferrite, and Ba, Ca, Na, and K represent amounts of respective elements on a molar basis.

2. The sintered ferrite magnet according to claim 1, wherein the following Expression (2) is satisfied:

$$3.2 \leq (Sr_F+Ba+Ca+2Na+2K)/Si \leq 3.5 \quad (2),$$

wherein in Expression (2), $Sr_F$ represents an amount of Sr, on a molar basis, other than Sr which constitutes the Sr ferrite, and Ba, Ca, Na, and K represent amounts of respective elements on a molar basis.

3. The sintered ferrite magnet according to claim 1, wherein the following Expression (3) is satisfied:

$$Br+⅓HcJ \geq 5.2 \quad (3),$$

wherein in Expression (3), Br and HcJ represent a residual magnetic flux density (kG) and a coercive force (kOe), respectively.

4. The sintered ferrite magnet according to claim 1, wherein an average grain size of crystal grains of the Sr ferrite is 1.0 μm or less, and
   a ratio of the crystal grains, which have a grain size of 2.0 μm or more, on the number basis is 1% or less.

5. A motor, comprising:
   the sintered ferrite magnet according to claim 1.

* * * * *